(12) United States Patent
Chacon, Jr. et al.

(10) Patent No.: US 12,435,891 B2
(45) Date of Patent: Oct. 7, 2025

(54) EASY ACCESS AIR VENT

(71) Applicants: Bernardo Garu Chacon, Jr., Hollywood, FL (US); Keevon Mcrae, Hollywood, FL (US)

(72) Inventors: Bernardo Garu Chacon, Jr., Hollywood, FL (US); Keevon Mcrae, Hollywood, FL (US)

(*) Notice: Subject to any disclaimer, the term of this patent is extended or adjusted under 35 U.S.C. 154(b) by 420 days.

(21) Appl. No.: 17/871,287

(22) Filed: Jul. 22, 2022

(65) Prior Publication Data
US 2023/0235902 A1 Jul. 27, 2023

Related U.S. Application Data

(60) Provisional application No. 63/302,482, filed on Jan. 24, 2022.

(51) Int. Cl.
| | | |
|---|---|---|
| *F24F 13/28* | (2006.01) | |
| *F24F 3/06* | (2006.01) | |
| *F24F 8/50* | (2021.01) | |
| *F24F 11/89* | (2018.01) | |
| *F24F 13/08* | (2006.01) | |
| *F24F 13/20* | (2006.01) | |

(52) U.S. Cl.
CPC .............. *F24F 8/50* (2021.01); *F24F 13/085* (2013.01); *F24F 13/20* (2013.01)

(58) Field of Classification Search
CPC ..... F24F 8/50; F24F 3/12; A61L 9/042; A61L 9/12; B60H 3/0007; B60H 3/0085; B60H 2003/0042; B01D 46/0038
See application file for complete search history.

(56) References Cited

U.S. PATENT DOCUMENTS

| | | | | |
|---|---|---|---|---|
| 4,523,870 A | * | 6/1985 | Spector ................ | B60H 3/0028 239/57 |
| 6,165,419 A | * | 12/2000 | Bullock ................... | A61L 9/12 239/57 |
| 7,223,166 B1 | * | 5/2007 | Wiseman, Sr. ........... | F24F 8/50 222/647 |

(Continued)

FOREIGN PATENT DOCUMENTS

CN 110887144 A * 3/2020

OTHER PUBLICATIONS

Liu, CN110887144 and translation (Year: 2020).*

*Primary Examiner* — Steven S Anderson, II (57) ABSTRACT

An easy access air vent is an apparatus that facilitates the maintenance of the air vent as well as other accessories equipped to the air vent. The apparatus includes a vent frame, a vent grate, a scent dispenser, a filter-receiving bracket, a wall frame, a replaceable air filter, and a replaceable scent cartridge. The wall frame secures the apparatus to the desired surface. The vent frame facilitates the maintenance of the replaceable air filter and the replaceable scent cartridge. The vent grate guides the airflow through the vent grate towards a desired direction. The scent dispenser retains the replaceable scent cartridge to enable the dispensing the scent in the airflow. The filter-receiving bracket retains the replaceable air filter in an accessible manner against the vent frame. The replaceable air filter removes pollutants from the airflow. The replaceable scent cartridge contains the scent material that is carried by the airflow.

17 Claims, 12 Drawing Sheets

(56) References Cited

U.S. PATENT DOCUMENTS

| | | | | |
|---|---|---|---|---|
| 7,524,362 B2* | 4/2009 | Wu | .................... | B01D 46/0005 |
| | | | | 96/417 |
| 2002/0139251 A1* | 10/2002 | Simmons | ................. | B60H 1/34 |
| | | | | 55/385.3 |
| 2007/0111653 A1* | 5/2007 | Endou | .................. | B60H 1/3421 |
| | | | | 454/155 |

* cited by examiner

EASY ACCESS AIR VENT

The current application claims a priority to the U.S. provisional patent application Ser. No. 63/302,482 filed on Jan. 24, 2022.

FIELD OF THE INVENTION

The present invention relates generally to heating, ventilation, and air conditioning (HVAC) systems. More specifically, the present invention provides a vent assembly that can be easily disassembled for maintenance without completely removing the assembly from the wall.

BACKGROUND OF THE INVENTION

Air vents are important components of heating, ventilation, and air conditioning (HVAC) systems. In general, an air vent is an opening on wall, ceiling, or floor that is covered by a grate or grill that allows air to circulate inside a building. Air vents can be configured to allow airflow into the building from the HVAC system or to allow airflow to return to the HVAC system for treatment. Many air vents are also equipped with air filters to remove pollutants from the air flow. For proper operation of the HVAC system, the air vents need proper maintenance, such as cleaning the air vent and/or the air filter or replacing the air filter with a new one. However, air vents in general can be difficult to maintain due to the way the air vent is installed on the wall, ceiling, or floor. Most air vents are fastened to the building structure, requiring various tools to be used to remove the air vent for maintenance. Further, most air vents equipped with an air filter require complete removal from the building structure to replace the air filter. All this can make proper air vent maintenance a nuisance for the user to do, which can negatively impact the operation of the HVAC system if not done periodically. Therefore, there is a need for a new air vent that is easier to maintain.

An objective of the present invention is to provide an easy access air vent that facilitates the maintenance of the air vent and other accessories equipped to the air vent. The present invention facilitates the maintenance process by providing an assembly that does not require to be fully removed from the wall, ceiling, or floor of the building to be cleaned and properly maintained. Another objective of the present invention is to provide an easy access air vent that accommodates multiple accessories that enhance the operation of the air vent. The present invention accommodates various accessories including, but not limited to, an air filter, a scent compartment, and means to alert the user when the present invention needs maintenance. Additional features and benefits of the present invention are further discussed in the sections below.

SUMMARY OF THE INVENTION

The present invention is an easy access air vent that facilitates the maintenance of the air vent as well as the several accessories equipped to the air vent. The present invention provides an air vent assembly that enables the maintenance of the air vent by facilitating the removal of the air vent from the rest of the assembly without the use of tools. In addition, the air vent assembly of the present invention also accommodates various accessories that enhance the operation of the air vent. The present invention may include, but is not limited to, means to removably secure an air filter to the air vent, a scent dispenser, and means to notify the user when the present invention requires maintenance.

The air filter is secured to the air vent of the present invention in such a way that the air filter can be easily replaced. The scent dispenser of the present invention enables the dispensing of desired scents that are dispersed by the airflow circulating through the air vent of the present invention. Further, the present invention includes various means to indicate that the air vent, the air filter, and/or the scent dispenser require maintenance. For example, the present invention can include visual or auditory means to alert the user when maintenance is required, such as a light or a sound alarm. Other features can be included to enhance the operation of the present invention or to further facilitate the maintenance of the components of the present invention. For example, additional fastening means can be provided to further secure the air vent to the building structure when the air vent may accidentally decouple.

DETAIL DESCRIPTIONS OF THE INVENTION

All illustrations of the drawings are for the purpose of describing selected versions of the present invention and are not intended to limit the scope of the present invention.

The present invention is an easy access air vent that facilitates the maintenance of the air vent as well as any other accessory equipped to the air vent. The present invention provides an air vent assembly that can be quickly and effortlessly disassembled without the use of tools so that the user can perform maintenance on the air vent. As can be seen in FIGS. 1 through 4, 6, and 7, the present invention comprises a vent frame 1, a vent grate 7, a scent dispenser 9, a filter-receiving bracket 15, a wall frame 2, a replaceable air filter 18, and a replaceable scent cartridge 19. The wall frame 2 is designed to secure the assembly to the desired location in the building such as, but not limited to, a wall, the ceiling, the floor, etc. The vent frame 1 serves to facilitate the attachment of the rest of the components to the wall frame 2 in such a way that the vent frame 1 can be easily removed from the wall frame 2 without the use of external tools. The vent grate 7 serves to guide the airflow through the vent grate 7 towards a desired direction. The scent dispenser 9 securely retains the replaceable scent cartridge 19 to enable the dispensing of the scent in the airflow. The filter-receiving bracket 15 securely retains the replaceable air filter 18 in such a way that the replaceable air filter 18 can be easily removed for maintenance. The replaceable air filter 18 serves to remove pollutants from the airflow through the vent grate 7. The replaceable scent cartridge 19 contains the scent material that is carried by the airflow through the vent grate 7.

The general configuration of the aforementioned components enables users to keep air vents in good conditions so that the heating, ventilation, and air conditioning (HVAC) system of the building runs efficiently. The wall frame 2 is designed to fit on an opening of an HVAC duct positioned on a wall, ceiling, or floor of the building. As can be seen in FIGS. 1 through 4, 6, and 7, the wall frame 2 is preferably a rectangular structure with a center opening that receives the vent frame 1. Similar to the wall frame 2, the vent frame 1 is also preferably a rectangular structure that fits within the center opening of the wall frame 2 to cover the center opening of the wall frame 2. To enable the vent frame 1 to fit in the wall frame 2, the vent frame 1 and the wall frame 2 each comprises a proximal frame face 3, a distal frame face 4, an inner frame surface 5, and an outer frame surface 6. The distal frame face 4 of the wall frame 2 preferably corresponds to the face oriented away from the HVAC duct, while the proximal frame face 3 of the wall frame 2 corresponds to the face oriented towards the HVAC duct. The inner frame surface 5 of the wall frame 2 preferably corresponds to the surface positioned adjacent to the central opening of the wall frame 2 while the outer frame surface 6 of the wall frame 2 corresponds to the surface positioned against the HVAC duct. Similarly, the distal frame face 4 of the vent frame 1 preferably corresponds to the face oriented away from the HVAC duct, while the proximal frame face 3 of the vent frame 1 corresponds to the face oriented towards the HVAC duct. The inner frame surface 5 of the vent frame 1 preferably corresponds to the surface positioned adjacent to the central opening of the vent frame 1 while the outer frame surface 6 of the vent frame 1 corresponds to the surface positioned against the wall frame 2.

To assemble the present invention, the vent grate 7 is mounted onto the inner frame surface 5 of the vent frame 1, as can be seen in FIGS. 1 through 4, 6, and 7. This enables the user to control the direction of the airflow through the vent frame 1. Further, the scent dispenser 9 is centrally mounted to the vent frame 1 so that the airflow through the vent frame 1 helps disseminate the scent. The filter-receiving bracket 15 is mounted onto the proximal frame face 3 of the vent frame 1 to receive the replaceable air filter 18 without blocking the vent grate 7. Further, the replaceable scent cartridge 19 is removably mounted within the scent dispenser 9 to provide the scent material to generate pleasant odors. On the other hand, the replaceable air filter 18 is removably mounted within the filter-receiving bracket 15 to remove any pollutants and foreign particles from the airflow through the vent frame 1. Accordingly, the replaceable air filter 18 is in fluid communication with the vent grate 7 and the scent dispenser 9. Finally, to mount the vent frame 1 and the rest of the components to the wall frame 2, the inner frame surface 5 of the wall frame 2 is detachably attached to the outer frame surface 6 of the vent frame 1. This way, to perform maintenance on the present invention, the user just removes the vent frame 1 from the wall frame 2 to have access to the vent grate 7, the scent dispenser 9, and the filter-receiving bracket 15.

To facilitate the detachable mounting of the vent frame 1 to the wall frame 2, the present invention may further comprise at least one pin-lock mechanism 20. As can be seen in FIGS. 6 through 11, the at least one pin-lock mechanism 20 facilitates the detachable mounting of the vent frame 1 to the wall frame 2 by eliminating the need of external tools such as a screwdriver. To do so, the at least one pin-lock mechanism 20 comprises a plurality of spring-loaded pins 21 and a plurality of pin holes 22. The plurality of spring-loaded pins 21 serves to secure the vent frame 1 to the wall frame 2 by engaging with the plurality of pin holes 22 in such a way that the user does not need to utilize tools to engage or disengage the plurality of spring-loaded pins 21. Further, the plurality of pin holes 22 is distributed about the inner frame surface 5 of the wall frame 2. Further, each of the plurality of pin holes 22 traverses into the wall frame 2 from the inner frame surface 5 of the wall frame 2. This way, the plurality of pin holes 22 faces the outer frame surface 6 of the vent frame 1 to receive the plurality of spring-loaded pins 21. Similarly, the plurality of spring-loaded pins 21 is distributed about the outer frame surface 6 of the vent frame 1. This way, the plurality of spring-loaded pins 21 can engage the plurality of pin holes 22.

As can be seen in FIGS. 6 through 11, to secure the plurality of spring-loaded pins 21 to the vent frame 1, each of the plurality of spring-loaded pins 21 is operatively integrated into the outer frame surface 6 of the vent frame 1, wherein each of the plurality of spring-loaded pins 21 is used to protrude and retract from the outer frame surface 6 of the vent frame 1. For example, each spring-loaded pin can be housed within a receptacle externally integrated onto the vent frame 1. In addition, each spring-loaded pin includes a pin body and a spring, wherein the pin body is connected to the receptacle by the spring. This way, the pin body is kept protruding outside the receptacle by the spring while enabling the pin body to be pushed into the receptacle by an external force. The pin body then returns to the original position after the external force has been removed by the constant force of the compression of the spring. Finally, to engage the plurality of spring-loaded pins 21 with the plurality of pin holes 22, each of the plurality of spring-loaded pins 21 is engaged into a corresponding hole from the plurality of pin holes 22. Thus, the vent frame 1 is removably attached to the wall frame 2 by the at least one pin lock-mechanism without the use of tools or fasteners. In some embodiments, the user may also utilize fasteners to further secure the vent frame 1 to the wall frame 2 in situations where the vent frame 1 may require additional fastening to the wall frame 2, such as when the present invention is installed on a ceiling, or when the present invention is exposed to unauthorized users.

As can be seen in FIGS. 6 through 11, the at least one pin-lock mechanism 20 can be designed to facilitate the completely removal or the partial removal of the vent frame 1 from the wall frame 2 so that the user can easily perform maintenance on the present invention without complete disassembly of the present invention. To do so, the at least one pin-lock mechanism 20 may be a first pin-lock mechanism 23 and a second pin-lock mechanism 24. The first pin-lock mechanism 23 and the second pin-lock mechanism 24 are similar locking mechanisms that can be selectively engaged or disengaged. For example, the first pin-lock mechanism 23 and the second pin-lock mechanism 24 may each include a pair of spring-loaded pins and a corresponding pair of pin holes positioned opposite to each other across the vent frame 1. This way, the user can completely or partially remove the vent frame 1 from the wall frame 2 for maintenance. To do so, the plurality of spring-loaded pins 21 of the first pin-lock mechanism 23 and the plurality of spring-loaded pins 21 of the second pin-lock mechanism 24 are positioned offset from each other across the vent frame 1. Likewise, the plurality of pin holes 22 of the first pin-lock mechanism 23 and the plurality of pin holes 22 of the second pin-lock mechanism 24 are positioned offset from each other across the wall frame 2. By offsetting the first pin-lock mechanism 23 from the second pin-lock mechanism 24, each pin-lock mechanism can be used as a fulcrum around which the vent frame 1 can be pivoted while still being connected to the wall frame 2. This enables the user to perform the maintenance without completely removing the vent frame 1 from the wall frame 2 by just releasing one of the pin-lock mechanisms.

As can be seen in FIGS. 6 through 11, to enable the user to selectively release the plurality of spring-loaded pins 21 to remove the vent frame 1 from the wall frame 2, the at least one pin-lock mechanism 20 may further comprise a release mechanism 25 and a mechanism actuator 26. The mechanism actuator 26 serves as a manual trigger to engage the release mechanism 25, which disengages the plurality of spring-loaded pins 21 from the plurality of pin holes 22. To do so, the mechanism actuator 26 is integrated into the vent frame 1, adjacent to the distal frame face 4 of the vent frame 1. The mechanism actuator 26 can come in the form of a slider or lever which the user can move to trigger the release mechanism 25. In addition, the mechanism actuator 26 is operatively coupled to the plurality of spring-loaded pins 21 by the release mechanism 25, wherein the mechanism actuator 26 is used to trigger the release mechanism 25 to retract the plurality of spring-loaded pins 21 within the vent frame 1. For example, the release mechanism 25 can be an arm that is terminally connected to the mechanism actuator 26 at one end and terminally connected to the pin body of spring-loaded pin at the other end. Thus, as the mechanism actuator 26 is moved away from the corresponding pin hole, the pin body is also moved away from the pin hole until the pin body is released from the pin hole. In other embodiments, the release mechanism 25 can include other options, such as a tether that connects the pin body to the mechanism actuator 26.

Further, the release mechanism 25 and the mechanism actuator 26 can be designed to control all the plurality of spring-loaded pins 21 or a set of the plurality of spring-loaded pins 21, as can be seen in FIGS. 6 through 11. For example, in the embodiment where the at least one pin-lock mechanism 20 includes a first pin-lock mechanism 23 and a second pin-lock mechanism 24, the release mechanism 25 can include a first releaser and a second releaser, and the mechanism actuator 26 can include a first actuator and a second actuator. The first releaser and the first actuator are positioned adjacent to the first pin-lock mechanism 23 and are configured to disengage the plurality of spring-loaded pins 21 of the first pin-lock mechanism 23. On the other hand, the second releaser and the second actuator are positioned adjacent to the second pin-lock mechanism 24 and are configured to disengage the plurality of spring-loaded pins 21 of the second pin-lock mechanism 24. This way, the user can selectively disengage the first pin-lock mechanism 23, the second pin-lock mechanism 24, or both to remove the vent frame 1 completely or partially from the wall frame 2 for maintenance purposes.

Figure 9:
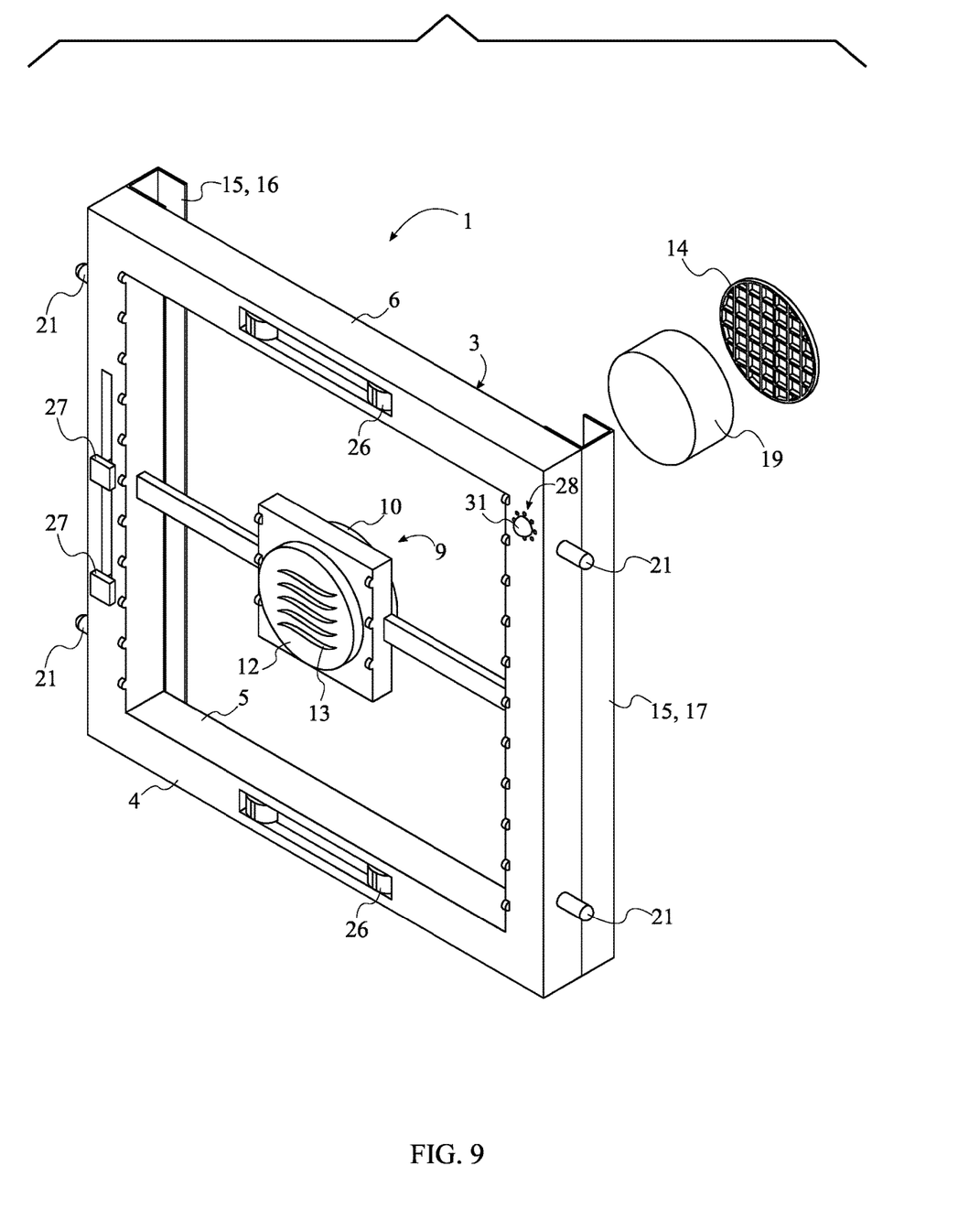
FIG. 9 is a top-front exploded perspective view showing the vent frame of the present invention, wherein the vent frame is shown without the vent grate.
Figure 10:
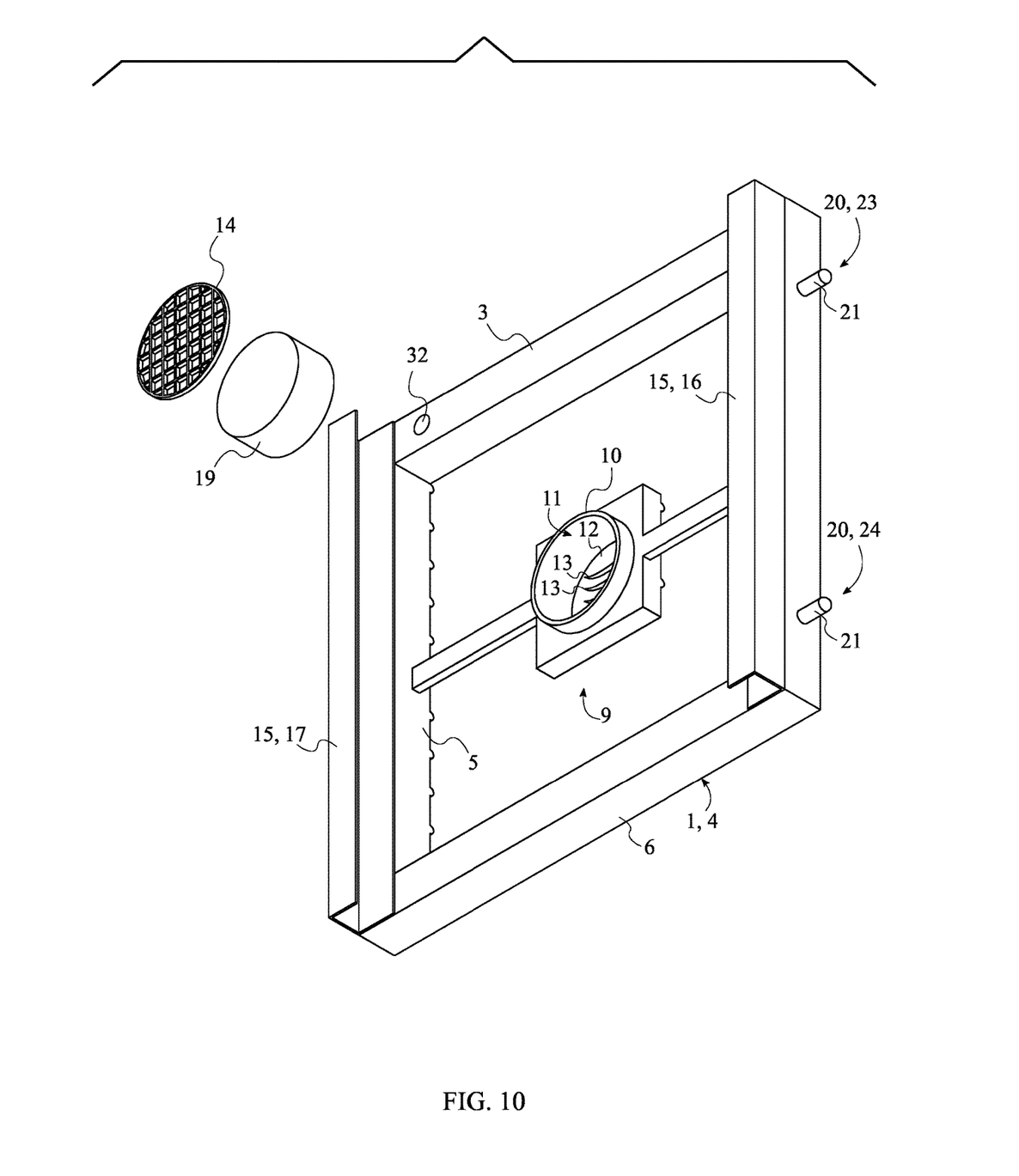
FIG. 10 is a bottom-rear exploded perspective view showing the vent frame of the present invention, wherein the vent frame is shown without the vent grate.
Figure 11:
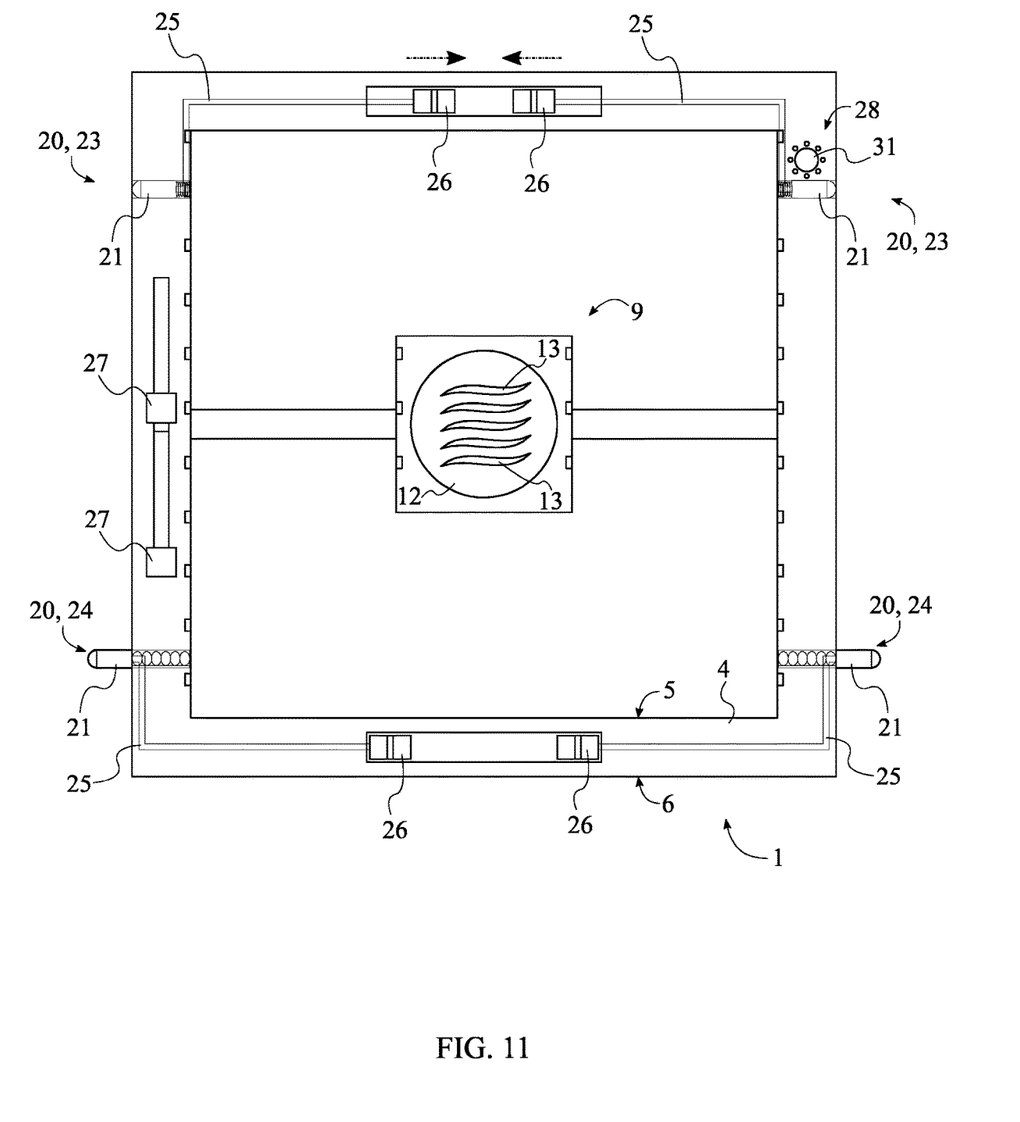
FIG. 11 is a front view showing the vent frame of the present invention, wherein the vent frame is shown without the vent grate, and wherein the plurality of spring-loaded pins of the first pin-lock mechanism is shown released by the corresponding release mechanism.

As previously discussed, the scent dispenser 9 is designed to hold the replaceable scent cartridge 19 in such a way that the replaceable scent cartridge 19 is exposed to the airflow through the vent grate 7. As can be seen in FIGS. 9 and 10, to do so, the scent dispenser 9 comprising a dispenser receptacle 10, a plurality of scent openings 13, and a dispenser mesh 14. The dispenser receptacle 10 is a housing that securely holds the replaceable scent cartridge 19. The plurality of scent openings 13 enable the airflow carrying the scent out of the dispenser receptacle 10. The dispenser mesh 14 secures the replaceable scent cartridge 19 inside the dispenser receptacle 10. The dispenser receptacle 10 is configured to accommodate the replaceable scent cartridge 19. To do so, the dispenser receptacle 10 comprises a receptacle opening 11 and a receptacle base 12. To integrate the scent dispenser 9 into the vent frame 1, the receptacle base 12 is positioned adjacent to the distal frame face 4 of the vent frame 1. In addition, the receptacle opening 11 is positioned adjacent to the proximal frame face 3 of the vent frame 1. This way, the replaceable scent cartridge 19 can be inserted into the dispenser receptacle 10 from the proximal frame face 3 of the vent frame 1. Further, the plurality of scent openings 13 traverses through the receptacle base 12 so that airflow entering through the receptacle opening 11 can exit through the plurality of scent openings 13. Further, the replaceable scent cartridge 19 is positioned within the dispenser receptacle 10. This way, as the airflow passes through the dispenser receptacle 10, the scent material within the replaceable scent cartridge 19 is exposed to the airflow, and the scent is carried by the airflow as the airflow exits the dispenser receptacle 10 through the plurality of scent openings 13. Finally, the dispenser mesh 14 is mounted across receptacle opening 11 to prevent the replaceable scent cartridge 19 from falling out of the dispenser receptacle 10 through the receptacle opening 11.

Figure 8:
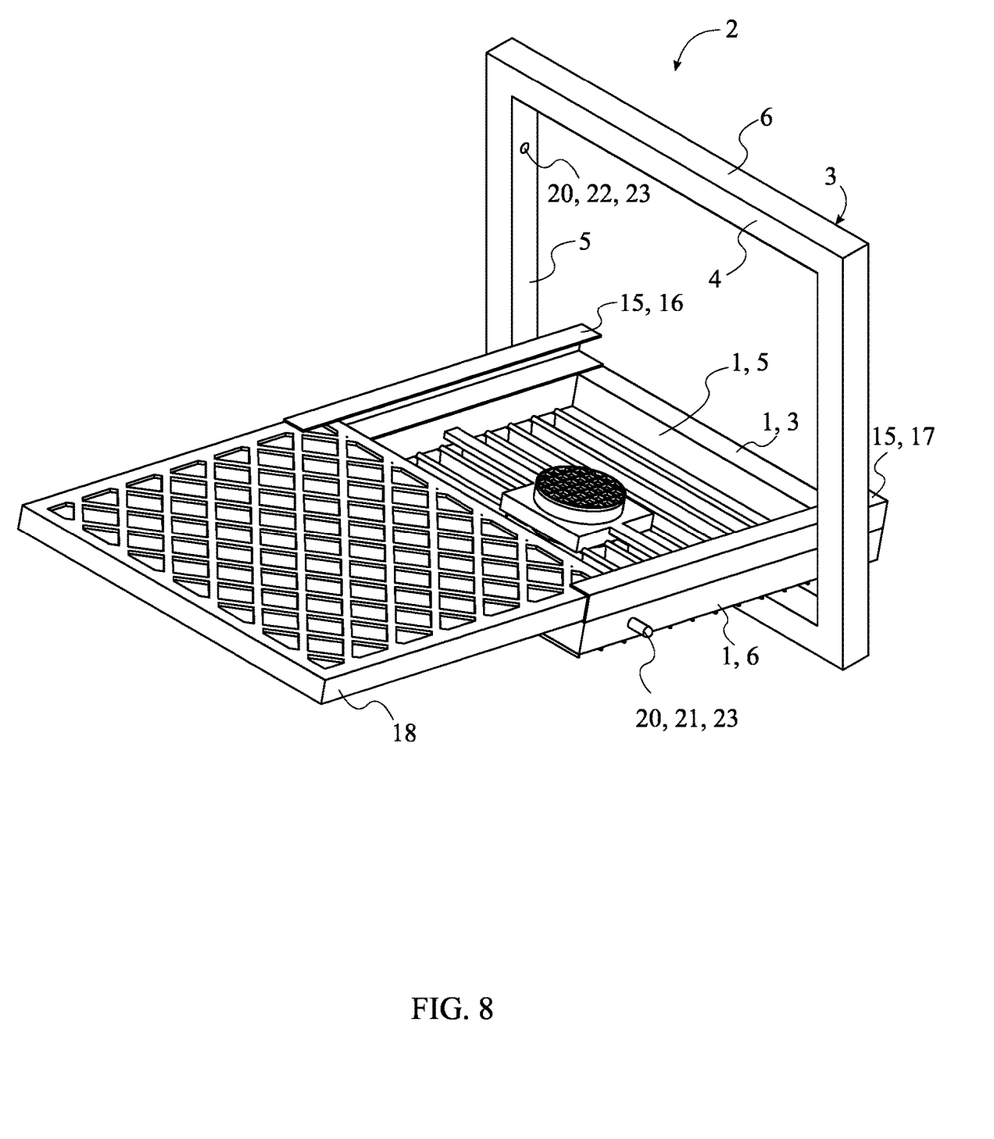
FIG. 8 is a top-front perspective view showing the present invention, wherein the vent frame is shown hinged from the wall frame by the second pin-lock mechanism, and wherein the replaceable air filter is shown being removed from the filter-receiving bracket.

Similar to the scent dispenser 9, the filter-receiving bracket 15 is designed to facilitate the replacement of the replaceable air filter 18 without tools for maintenance purposes. As can be seen in FIGS. 8 through 10, to do so, the filter-receiving bracket 15 may further comprise a first C-channel 16 and a second C-channel 17. The first C-channel 16 and the second C-channel 17 are designed to hold the replaceable air filter 18 against the vent grate 7 without the use of fasteners. To accommodate the replaceable air filter 18, the first C-channel 16 and the second C-channel 17 are positioned parallel to each other. In addition, the first C-channel 16 and the second C-channel 17 are also oriented towards each other. This way, the first C-channel 16 and the second C-channel 17 form a space that fits the replaceable air filter 18. In addition, the space formed by the first C-channel 16 and the second C-channel 17 is big enough to accommodate the replaceable air filter 18 in such a way that the replaceable air filter 18 is kept in position between the first C-channel 16 and the second C-channel 17 due to friction against the first C-channel 16 and the second C-channel 17. Further, to insert the replaceable air filter 18 into the filter-receiving bracket 15, the replaceable air filter 18 is slidably engaged in between the first C-channel 16 and the second C-channel 17. Finally, the replaceable air filter 18 and the inner vent frame 1 are coextensive to each other. As a result, the replaceable air filter 18 covers the vent grate 7 so that all airflow through the vent grate 7 is filtered to remove pollutants and other air particles from the airflow.

As previously discussed, the vent grate 7 enables the user to control the direction of the airflow exiting the HVAC ducts. As can be seen in FIGS. 1 through 5, to do so, the vent grate 7 may comprise a plurality of shutters 8. The plurality of shutters 8 serves to deflect the airflow exiting the HVAC duct in a desired direction. For example, this enables the user to control the temperature of the room inside the building by guiding the airflow towards the floor or to specific areas of the room. To enable the control of the airflow direction, the plurality of shutters 8 is positioned parallel to each other to create a symmetric barrier that guides the airflow in the desired direction. In addition, each of the plurality of shutters 8 is positioned across the vent frame 1 so that each shutter spans the width of the vent frame 1. Further, the plurality of shutters 8 is distributed across the vent frame 1 so that the shutters cover the whole center opening of the vent frame 1. Furthermore, each of the plurality of shutters 8 is hingedly connected to the vent frame 1. This enables the plurality of shutters 8 to be rotated in an angular direction to direct the airflow out of the HVAC duct in the desired direction. For example, the shutters can be tilted upwards to guide the airflow towards the ceiling if the present invention is installed on a wall.

As can be seen in FIGS. 1 through 5, to help the user control the direction of the airflow exiting the HVAC duct, the present invention may further comprise at least one shutter slide 27. Similar to the mechanism actuator 26, the at least one shutter slide 27 enables the user to manually control the position of the plurality of shutters 8 to guide the airflow towards the desired direction. To do so, the at least one shutter slide 27 is slidably integrated into the distal frame face 4 of the vent frame 1. This enables the at least one shutter slide 27 to be accessible to the user when the vent frame 1 is mounted onto the wall frame 2. Further, each of the plurality of shutters 8 is hingedly connected to the at least one shutter slide 27. This way, when the at least one shutter slide 27 is moved in a first linear direction, the plurality of shutters 8 are rotated in a first angular direction. When the at least one shutter slide 27 is moved in a second linear direction, the plurality of shutters 8 are rotated in a second angular direction, wherein the second linear direction is opposite to the first linear direction, and the second angular direction is opposite to the first angular direction. In some embodiments, different sets of shutters from the plurality of shutters 8 can be arranged to be selectively rotated so that each set can be moved in a different direction to split the airflow through the vent grate 7 into different directions. This helps the user better distribute the filtered airflow so that the airflow reaches a wider area within the room of the building. To do so, the plurality of shutters 8 may include a first set of shutters and a second set of shutters. The at least one shutter slide 27 may also include a first shutter slide and a second shutter slide. Each shutter from the first set of shutters is hingedly connected to the first shutter slide, while each shutter from the second set of shutters is hingedly connected to the second shutter slide. This way, the user can move each set of shutters independently in different directions to split the airflow exiting the HVAC duct.

Figure 1:
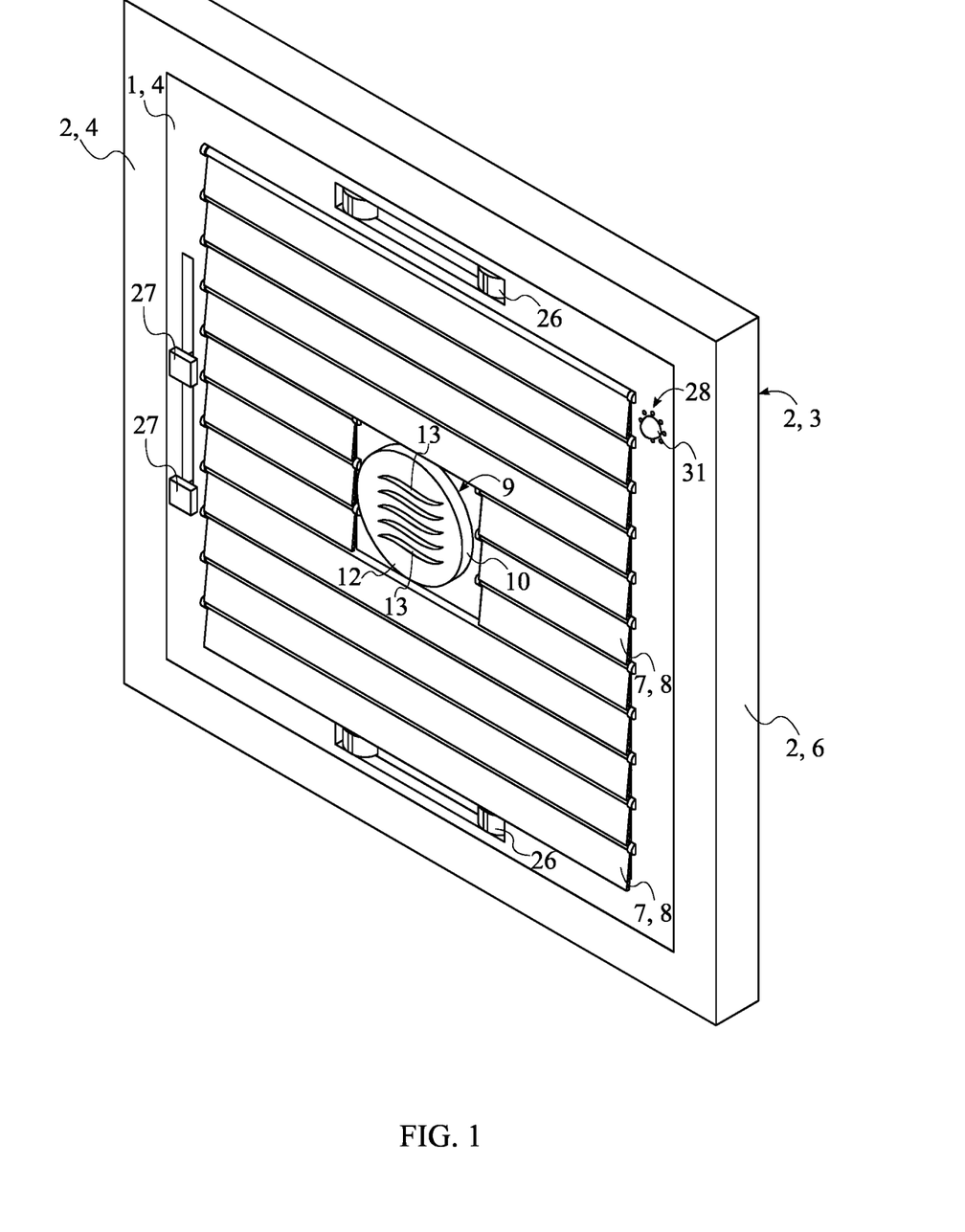
FIG. 1 is a top-front perspective view showing the present invention.
Figure 2:
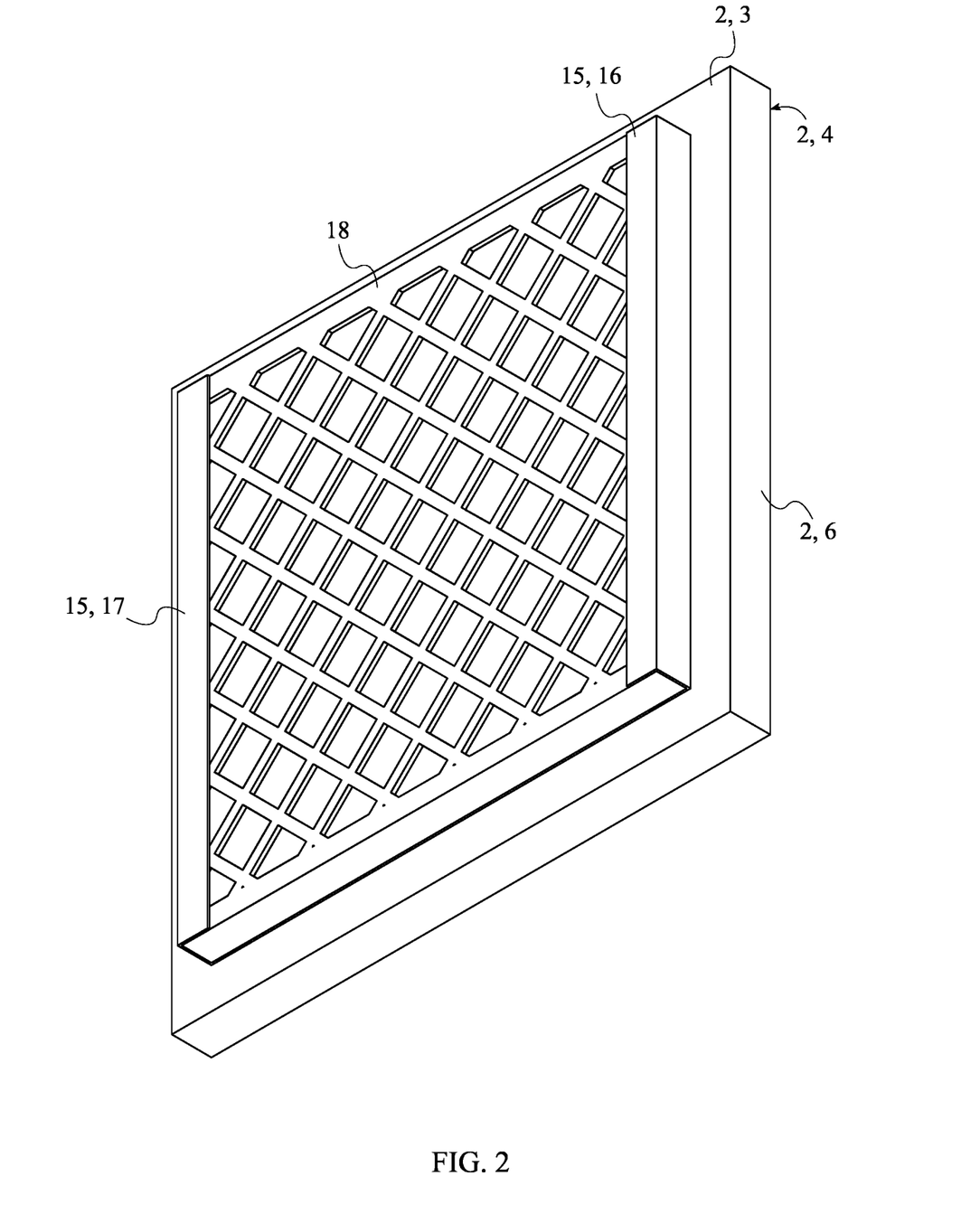
FIG. 2 is a bottom-rear perspective view showing the present invention.
Figure 3:
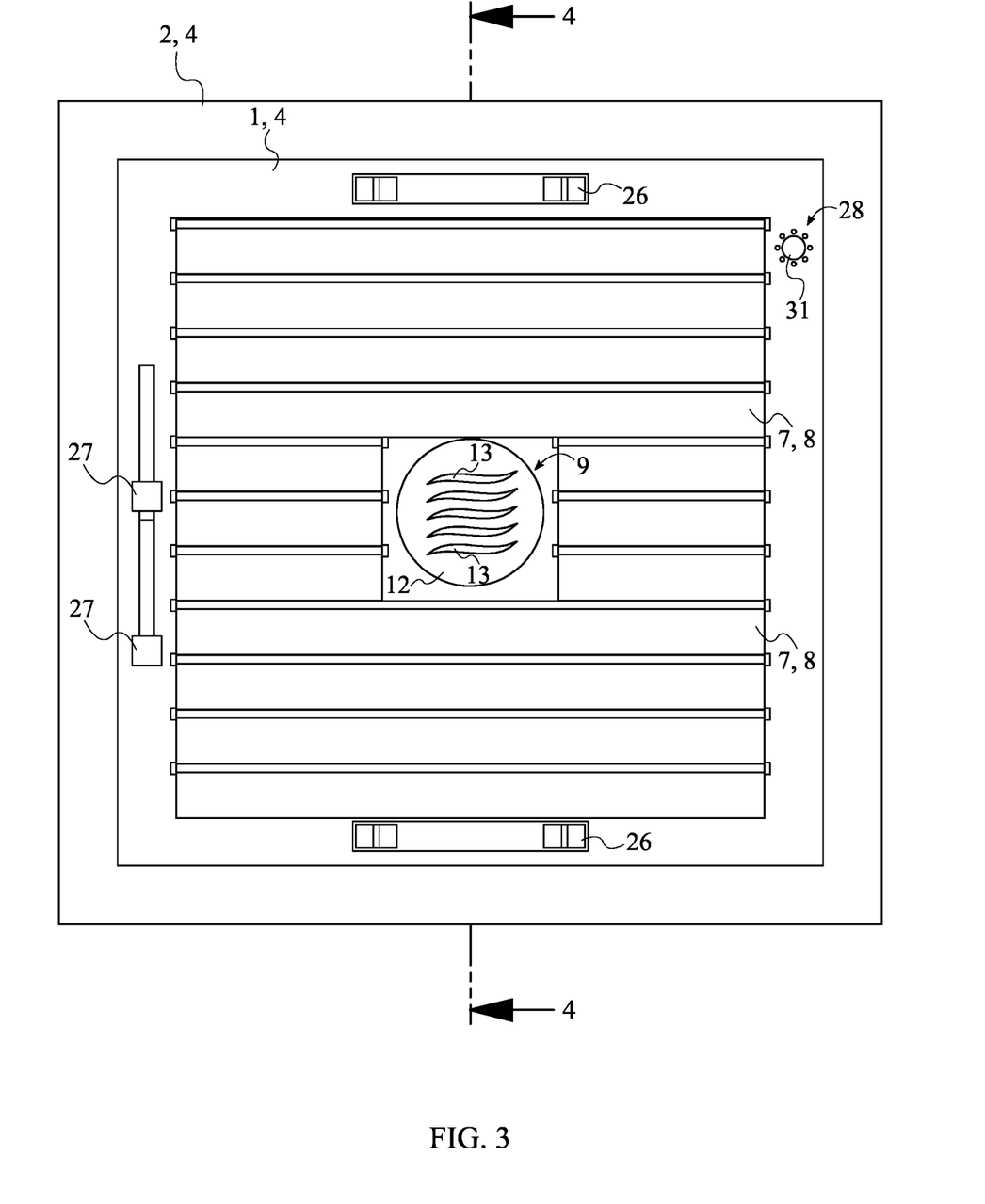
FIG. 3 is a front view showing the present invention.
Figure 4:
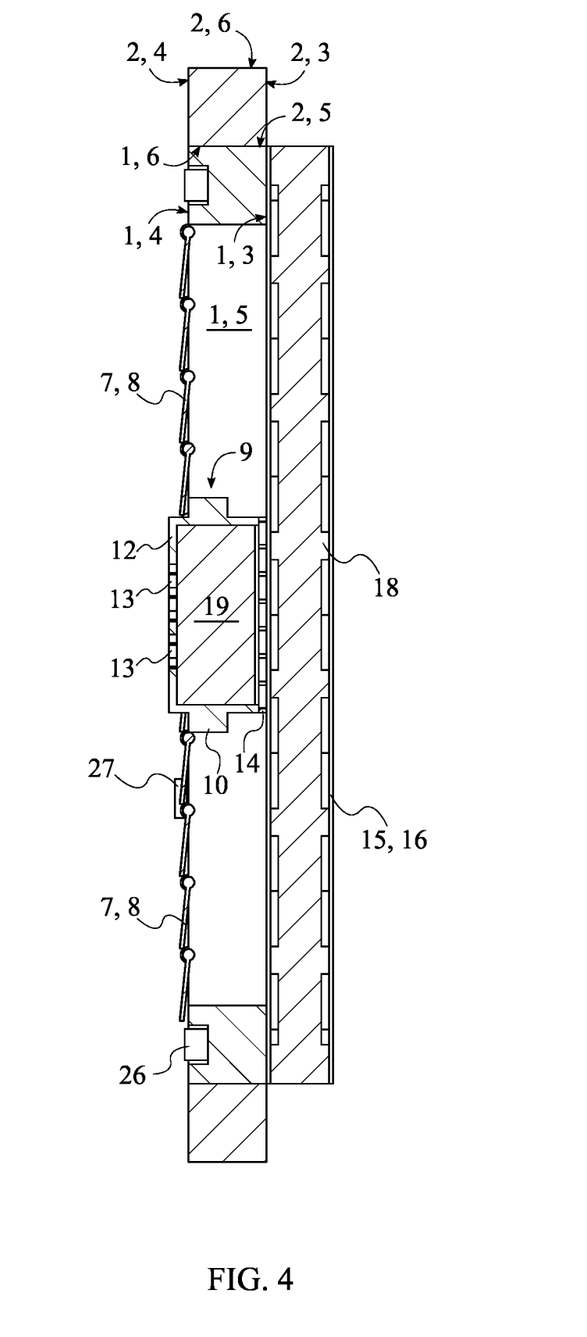
FIG. 4 is an enlarged vertical cross-sectional view taken along line 4-4 in FIG. 3.
Figure 5:
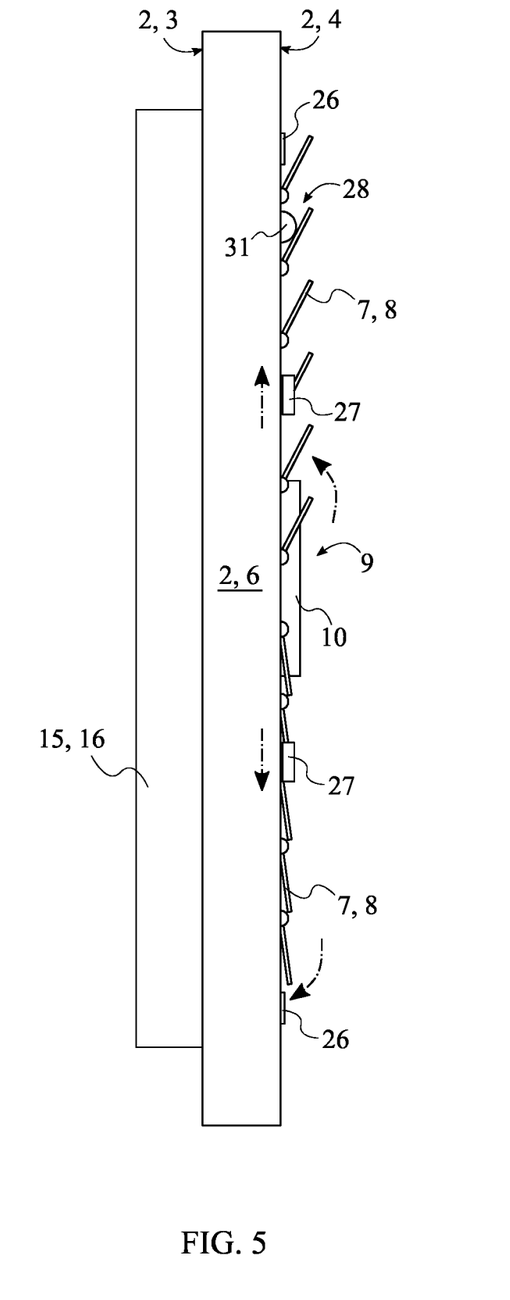
FIG. 5 is an enlarged side view showing the present invention, wherein a first set of shutters from the plurality of shutters is shown oriented in a first direction, and wherein a second set of shutters from the plurality of shutters is shown oriented in a second direction.
Figure 6:
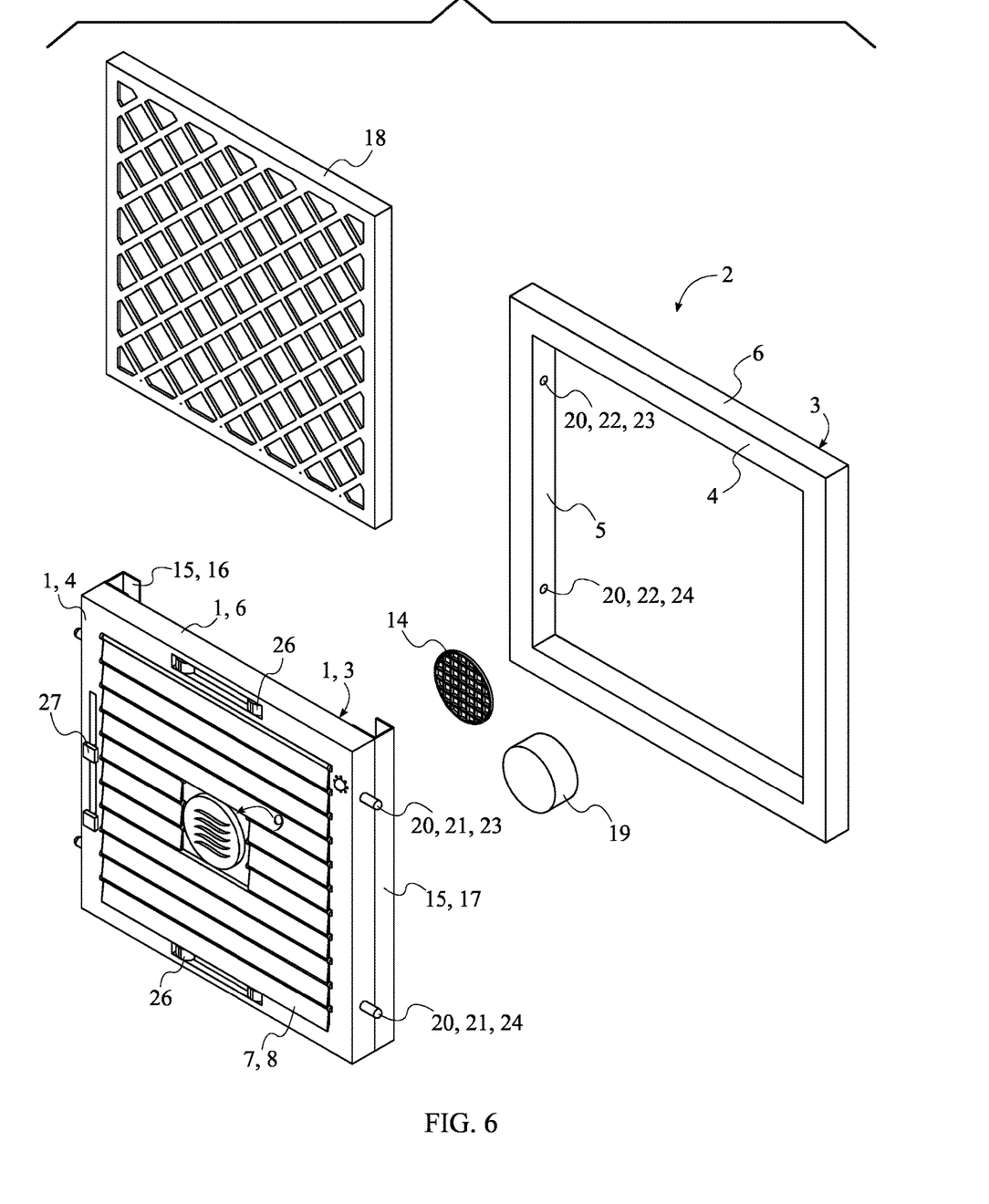
FIG. 6 is a reduced top-front exploded perspective view showing the present invention.
Figure 7:
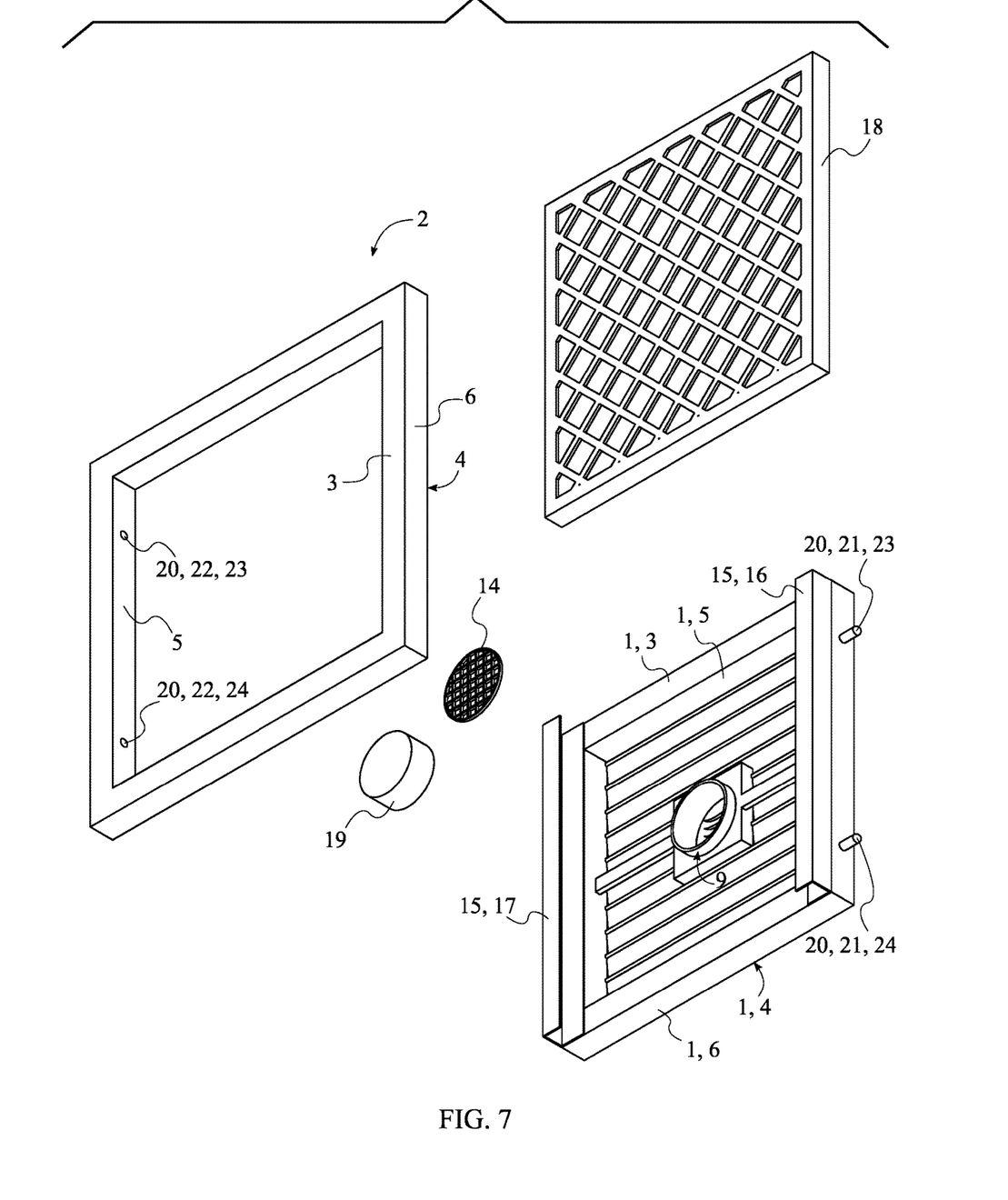
FIG. 7 is a reduced bottom-rear exploded perspective view showing the present invention.
Figure 12:
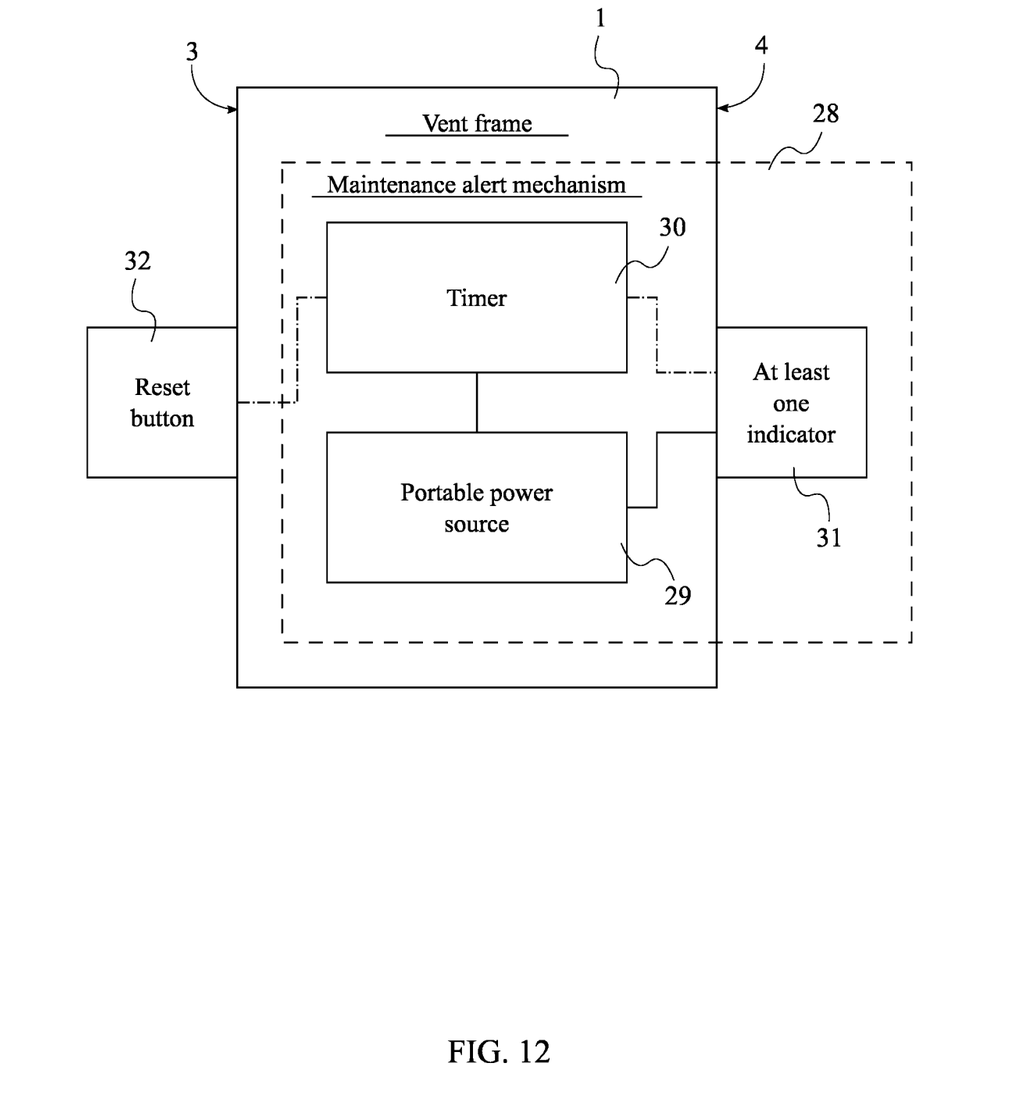
FIG. 12 is a schematic view showing the electrical connections and the electronic connections of the maintenance alert mechanism of the present invention, wherein the electrical connections are shown in solid lines, and wherein the electronic connections are shown in dot-dash lines.

As previously discussed, the present invention also includes means to alert the user when the present invention needs maintenance. As can be seen in FIGS. 1, 3, and 12, to do so, the present invention may further comprise a maintenance alert mechanism 28. The maintenance alert mechanism 28 can provide visual or auditory means to alert the user when the user needs to replace the replaceable air filter 18 and/or the replaceable scent cartridge 19. In order to generate a maintenance alert, the maintenance alert mechanism 28 may comprise a portable power source 29, a timer 30, and at least one indicator 31. The portable power source 29 provides the voltage necessary for the operation of the timer 30 and the at least one indicator 31. The portable power source 29 can be a replaceable power source, such as disposable batteries, or a rechargeable power source, such as rechargeable batteries. The timer 30 serves to automatically trigger the at least one indicator 31 after a predetermined period of time. The at least one indicator 31 can be a visual and/or auditory indicator such as a light or a speaker that emit a visual or auditory alert, respectively.

As can be seen in FIGS. 1, 3, and 12, to integrate the maintenance alert mechanism 28 into the vent frame 1, the timer 30 and the portable power source 29 are mounted within the vent frame 1. The at least one indicator 31 is mounted onto the distal frame face 4 of the vent frame 1. This way, the at least one indicator 31 remains visible after the vent frame 1 has been mounted within the wall frame 2. Further, the portable power source 29 is electrically connected to the timer 30 and the at least one indicator 31 to transmit the voltage to both the timer 30 and the at least one indicator 31. Furthermore, the timer 30 is electronically connected to the at least one indicator 31 to trigger the at least one indicator 31 after a predetermined period of time has passed. In some embodiments, the timer 30 can provide means for the user to configure how often the replaceable air filter 18 and/or the replaceable scent cartridge 19 need replacing. Further, different indicators can be provided to separately indicate the time for maintenance for the replaceable air filter 18 and the replaceable scent cartridge 19.

As can be seen in FIGS. 1, 3, and 12, to help the user reset the timer 30 after each maintenance, the present invention may further comprise a reset button 32. The reset button 32 helps the user reset the timer 30 so that the timer 30 restarts the countdown for the next maintenance. To integrate the reset button 32 into the vent frame 1, the reset button 32 is mounted onto the proximal frame face 3 of the vent frame 1. This way, the reset button 32 is only accessible once the vent frame 1 is removed from the wall frame 2. This prevents accidental resets of the timer 30. Further, the timer 30 is electronically connected to the reset button 32 so that the reset signal is triggered by the reset button 32. In other embodiments, the present invention may include sensors or other means to monitor the conditions of the replaceable air filter 18 and/or the replaceable scent cartridge 19 so that the timer 30 is automatically updated to trigger the at least one indicator 31 based on the conditions of the replaceable air filter 18 and/or the replaceable scent cartridge 19.

Although the invention has been explained in relation to its preferred embodiment, it is to be understood that many other possible modifications and variations can be made without departing from the spirit and scope of the invention.

What is claimed is:

1. An easy access air vent comprising:
   a vent frame;
   a vent grate;
   a scent dispenser;
   a filter-receiving bracket;

a wall frame;
a replaceable air filter;
a replaceable scent cartridge;
at least one pin-lock mechanism;
the vent frame and the wall frame each comprising a proximal frame face, a distal frame face, an inner frame surface, and an outer frame surface;
the at least one pin-lock mechanism comprising a plurality of spring-loaded pins, a plurality of pin holes, a release mechanism, and a mechanism actuator;
the vent grate being mounted onto the inner frame surface of the vent frame;
the scent dispenser being centrally mounted to the vent frame;
the filter-receiving bracket being mounted onto the proximal frame face of the vent frame;
the replaceable scent cartridge being removably mounted within the scent dispenser;
the replaceable air filter being removably mounted within the filter-receiving bracket;
the replaceable air filter being in fluid communication with the vent grate and the scent dispenser;
the inner frame surface of the wall frame being detachably attached to the outer frame surface of the vent frame;
the plurality of pin holes being distributed about the inner frame surface of the wall frame;
each of the plurality of pin holes traversing into the wall frame from the inner frame surface of the wall frame;
the plurality of spring-loaded pins being distributed about the outer frame surface of the vent frame;
each of the plurality of spring-loaded pins being operatively integrated into the outer frame surface of the vent frame, wherein each of the plurality of spring-loaded pins is used to protrude and retract from the outer frame surface of the vent frame;
each of the plurality of spring-loaded pins being engaged into a corresponding hole from the plurality of pin holes;
the mechanism actuator being integrated into the vent frame, adjacent to the distal frame face of the vent frame; and
the mechanism actuator being operatively coupled to the plurality of spring-loaded pins by the release mechanism, wherein the mechanism actuator is used to trigger the release mechanism to retract the plurality of spring-loaded pins within the vent frame.

2. The easy access air vent as claimed in claim 1 comprising:
the at least one pin-lock mechanism being a first pin-lock mechanism and a second pin-lock mechanism;
the plurality of spring-loaded pins of the first pin-lock mechanism and the plurality of spring-loaded pins of the second pin-lock mechanism being positioned offset from each other across the vent frame; and
the plurality of pin holes of the first pin-lock mechanism and the plurality of pin holes of the second pin-lock mechanism being positioned offset from each other across the wall frame.

3. The easy access air vent as claimed in claim 1 comprising:
the scent dispenser comprising a dispenser receptacle, a plurality of scent openings, and a dispenser mesh;
the dispenser receptacle comprising a receptacle opening and a receptacle base;
the receptacle base being positioned adjacent to the distal frame face of the vent frame;
the receptacle opening positioned adjacent to the proximal frame face of the vent frame;
the plurality of scent openings traversing through the receptacle base;
the replaceable scent cartridge being positioned within the dispenser receptacle; and
the dispenser mesh being mounted across receptacle opening.

4. The easy access air vent as claimed in claim 1 comprising:
the filter-receiving bracket comprising a first C-channel and a second C-channel;
the first C-channel and the second C-channel being positioned parallel to each other;
the first C-channel and the second C-channel being oriented towards each other;
the replaceable air filter being slidably engaged in between the first C-channel and the second C-channel; and
the replaceable air filter and the inner vent frame being coextensive to each other.

5. The easy access air vent as claimed in claim 1 comprising:
the vent grate comprising a plurality of shutters;
the plurality of shutters being positioned parallel to each other;
each of the plurality of shutters being positioned across the vent frame;
the plurality of shutters being distributed across the vent frame; and
each of the plurality of shutters being hingedly connected to the vent frame.

6. The easy access air vent as claimed in claim 5 comprising:
at least one shutter slide;
the at least one shutter slide being slidably integrated into the distal frame face of the vent frame; and
each of the plurality of shutters being hingedly connected to the at least one shutter slide.

7. The easy access air vent as claimed in claim 1 comprising:
a maintenance alert mechanism;
the maintenance alert mechanism comprising a portable power source, a timer, and at least one indicator;
the timer and the portable power source being mounted within the vent frame;
the at least one indicator being mounted onto the distal frame face of the vent frame;
the portable power source being electrically connected to the timer and the at least one indicator; and
the timer being electronically connected to the at least one indicator.

8. The easy access air vent as claimed in claim 7 comprising:
a reset button;
the reset button being mounted onto the proximal frame face of the vent frame; and
the timer being electronically connected to the reset button.

9. An easy access air vent comprising:
a vent frame;
a vent grate;
a scent dispenser;
a filter-receiving bracket;
a wall frame;
a replaceable air filter;
a replaceable scent cartridge;

the vent frame and the wall frame each comprising a proximal frame face, a distal frame face, an inner frame surface, and an outer frame surface;
the scent dispenser comprising a dispenser receptacle, a plurality of scent openings, and a dispenser mesh;
the dispenser receptacle comprising a receptacle opening and a receptacle base;
the vent grate being mounted onto the inner frame surface of the vent frame;
the scent dispenser being centrally mounted to the vent frame;
the filter-receiving bracket being mounted onto the proximal frame face of the vent frame;
the replaceable scent cartridge being removably mounted within the scent dispenser;
the replaceable air filter being removably mounted within the filter-receiving bracket;
the replaceable air filter being in fluid communication with the vent grate and the scent dispenser;
the inner frame surface of the wall frame being detachably attached to the outer frame surface of the vent frame;
the receptacle base being positioned adjacent to the distal frame face of the vent frame;
the receptacle opening positioned adjacent to the proximal frame face of the vent frame;
the plurality of scent openings traversing through the receptacle base;
the replaceable scent cartridge being positioned within the dispenser receptacle; and
the dispenser mesh being mounted across receptacle opening.

10. The easy access air vent as claimed in claim 9 comprising:
at least one pin-lock mechanism;
the at least one pin-lock mechanism comprising a plurality of spring-loaded pins and a plurality of pin holes;
the plurality of pin holes being distributed about the inner frame surface of the wall frame;
each of the plurality of pin holes traversing into the wall frame from the inner frame surface of the wall frame;
the plurality of spring-loaded pins being distributed about the outer frame surface of the vent frame;
each of the plurality of spring-loaded pins being operatively integrated into the outer frame surface of the vent frame, wherein each of the plurality of spring-loaded pins is used to protrude and retract from the outer frame surface of the vent frame; and
each of the plurality of spring-loaded pins being engaged into a corresponding hole from the plurality of pin holes.

11. The easy access air vent as claimed in claim 10 comprising:
the at least one pin-lock mechanism being a first pin-lock mechanism and a second pin-lock mechanism;
the plurality of spring-loaded pins of the first pin-lock mechanism and the plurality of spring-loaded pins of the second pin-lock mechanism being positioned offset from each other across the vent frame; and
the plurality of pin holes of the first pin-lock mechanism and the plurality of pin holes of the second pin-lock mechanism being positioned offset from each other across the wall frame.

12. The easy access air vent as claimed in claim 10 comprising:
the at least one pin-lock mechanism further comprising a release mechanism and a mechanism actuator;
the mechanism actuator being integrated into the vent frame, adjacent to the distal frame face of the vent frame; and
the mechanism actuator being operatively coupled to the plurality of spring-loaded pins by the release mechanism, wherein the mechanism actuator is used to trigger the release mechanism to retract the plurality of spring-loaded pins within the vent frame.

13. The easy access air vent as claimed in claim 9 comprising:
the filter-receiving bracket comprising a first C-channel and a second C-channel;
the first C-channel and the second C-channel being positioned parallel to each other;
the first C-channel and the second C-channel being oriented towards each other;
the replaceable air filter being slidably engaged in between the first C-channel and the second C-channel; and
the replaceable air filter and the inner vent frame being coextensive to each other.

14. The easy access air vent as claimed in claim 9 comprising:
the vent grate comprising a plurality of shutters;
the plurality of shutters being positioned parallel to each other;
each of the plurality of shutters being positioned across the vent frame;
the plurality of shutters being distributed across the vent frame; and
each of the plurality of shutters being hingedly connected to the vent frame.

15. The easy access air vent as claimed in claim 14 comprising:
at least one shutter slide;
the at least one shutter slide being slidably integrated into the distal frame face of the vent frame; and
each of the plurality of shutters being hingedly connected to the at least one shutter slide.

16. The easy access air vent as claimed in claim 9 comprising:
a maintenance alert mechanism;
the maintenance alert mechanism comprising a portable power source, a timer, and at least one indicator;
the timer and the portable power source being mounted within the vent frame;
the at least one indicator being mounted onto the distal frame face of the vent frame;
the portable power source being electrically connected to the timer and the at least one indicator; and
the timer being electronically connected to the at least one indicator.

17. The easy access air vent as claimed in claim 16 comprising:
a reset button;
the reset button being mounted onto the proximal frame face of the vent frame; and
the timer being electronically connected to the reset button.

* * * * *